(12) United States Patent
Dickerhoof et al.

(10) Patent No.: US 8,335,598 B2
(45) Date of Patent: Dec. 18, 2012

(54) SYSTEM AND METHOD FOR DETECTING RADIO FREQUENCY SIGNALS AND CONTROLLING VEHICLE OPERATIONS IN RESPONSE THERETO

(75) Inventors: Greg Dickerhoof, Ann Arbor, MI (US); Gary Boothroyd, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 724 days.

(21) Appl. No.: 12/236,043

(22) Filed: Sep. 23, 2008

(65) Prior Publication Data

US 2010/0076622 A1 Mar. 25, 2010

(51) Int. Cl.
*G05D 1/00* (2006.01)

(52) U.S. Cl. ............... 701/2; 701/36; 701/207; 340/438

(58) Field of Classification Search .................... 701/29, 701/33, 36, 54, 207, 213–215, 300, 2; 340/436, 340/438; 455/13.3, 41.2
See application file for complete search history.

(56) References Cited

U.S. PATENT DOCUMENTS

| | | | |
|---|---|---|---|
| 5,723,911 A | 3/1998 | Glehr | |
| 6,087,987 A | 7/2000 | Bachhuber et al. | |
| 6,208,239 B1 | 3/2001 | Muller et al. | |
| 6,211,776 B1 | 4/2001 | Rohrl et al. | |
| 6,445,928 B1 | 9/2002 | Ruutu et al. | |
| 6,618,005 B2 | 9/2003 | Hannah et al. | |
| 6,707,378 B2 * | 3/2004 | MacNeille et al. | 340/435 |
| 6,747,599 B2 | 6/2004 | McEwan | |
| 6,760,591 B1 | 7/2004 | Klinger | |
| 6,784,826 B2 | 8/2004 | Kane et al. | |
| 6,803,882 B2 | 10/2004 | Hoetzel | |
| 6,937,136 B2 | 8/2005 | Greenwood et al. | |
| 6,965,296 B2 | 11/2005 | Kamlah | |
| 7,256,681 B1 | 8/2007 | Moody et al. | |
| 2003/0001776 A1 | 1/2003 | Hannah et al. | |
| 2003/0137453 A1 | 7/2003 | Hannah et al. | |
| 2006/0145922 A1 | 7/2006 | Hill | |

(Continued)

FOREIGN PATENT DOCUMENTS

WO 0008280 A2 2/2000

(Continued)

OTHER PUBLICATIONS

Ralph Bucher et al., A Synthesizable VHDL Model of the Exact Solution for Three-dimensional Hyperbolic Positioning System, VLSI Design, 2002 vol. 15 (2), pp. 507-520.

(Continued)

*Primary Examiner* — Gertrude Arthur Jeanglaude
(74) *Attorney, Agent, or Firm* — Brooks Kushman P.C.

(57) ABSTRACT

A system for determining the location of a portable wireless device with respect to a vehicle is provided. The system comprises a plurality of antennas and a controller. The antennas are positioned about the vehicle for receiving a wireless signal from the portable wireless device. The portable wireless device for being carried by a user and the wireless signal corresponding to at least one of a command and status related to a predetermined vehicle operation. The controller for being operably coupled to each antenna. The controller being configured to generate a location signal indicative of the location of the portable wireless device based on an arrival time of the wireless signal at one or more antennas of the plurality of antennas. The controller being configured to perform the predetermined vehicle operation based on the location signal.

17 Claims, 6 Drawing Sheets

U.S. PATENT DOCUMENTS

| | | |
|---|---|---|
| 2007/0241865 A1 | 10/2007 | Sato |
| 2008/0076373 A1 | 3/2008 | Takahashi et al. |
| 2010/0171642 A1 | 7/2010 | Hassan et al. |
| 2010/0305779 A1 | 12/2010 | Hassan et al. |

FOREIGN PATENT DOCUMENTS

| | | |
|---|---|---|
| WO | 0100461 A1 | 1/2001 |
| WO | 2008154747 A1 | 12/2008 |
| WO | 2009143415 A1 | 11/2009 |

OTHER PUBLICATIONS

Reynolds, "A Phase Measurement Radio Positioning System for Indoor Use", Massachusetts Institute of Technology, Feb. 3, 1999, 66 pages.
Office Action for corresponding U.S. Appl. No. 13/364,480, mailed Jul. 10, 2012, 11 pages.
English translation of WO 0100461, Sep. 14, 2012, 6 pages.
Machine translation of WO 200008280, Sep. 11, 2012, 13 pages.
Machine translation of WO 2001000461, Sep. 11, 2012, 16 pages.

\* cited by examiner

TABLE 1a

| First Antenna to Receive RF Signal: | 16c | 16b | | 16a | | | 16b | | |
|---|---|---|---|---|---|---|---|---|---|
| Second Antenna to Receive RF Signal: | | 16n | | 16c | | | 16c | | 16n |
| Third Antenna to Receive RF Signal: | | | 16b | 16n | 16c | 16c | 16n | 16a | 16c |
| Resolves to Zone: | | 2 | 1 | 3 | | 4 | | | |

Fig-6A

TABLE 1b

| First Antenna to Receive RF Signal: | 16b | | 16a | | | 16c | | | 16n |
|---|---|---|---|---|---|---|---|---|---|
| Second Antenna to Receive RF Signal: | | | 16n | | | 16b | | | 16b |
| Third Antenna to Receive RF Signal: | | 16a | 16n | 16b | 16c | 16n | 16c | 16a | 16b |
| Resolves to Zone: | | | 5 | 6 | 8 | | | 7 | |

Fig-6B

SYSTEM AND METHOD FOR DETECTING RADIO FREQUENCY SIGNALS AND CONTROLLING VEHICLE OPERATIONS IN RESPONSE THERETO

BACKGROUND

1. Technical Field

One or more embodiments of the present invention described herein generally relate to a system and method for detecting radio frequency (RF) signals and controlling vehicle operations in response thereto.

2. Background Art

Tire pressure monitoring systems, remote keyless entry systems, passive entry/passive start, and or immobilizer systems for automotive applications are known to include one or more antennas positioned about the vehicle to receive radio frequency signals from RF based transmitters. Such transmitters may be in the form of tire pressure sensors that transmit tire pressure information to one or more of the antennas. The antennas, in turn, present the RF signal to a receiver in a controller. The controller processes such signals to determine moments in which one or more of the tires include a low tire pressure reading. The controller generally determines the location of the tire that includes a particular tire pressure sensor based on ID information contained within the RF signal.

The keyfob may be used in conjunction with a passive entry/passive start system. With passive entry, the controller generally determines which door to unlock based on the location of the keyfob with respect to the vehicle. With passive start, the controller determines whether the driver is in the vehicle based on the location of the keyfob. For example, the controller may be able to determine whether the keyfob is in the vehicle within the driver's zone.

A number of RF based vehicle operations (including those stated above) offered in vehicles today generally utilize multiple discrete antennas that are distributed throughout the vehicle to identify the location of the RF transmitter with respect to the vehicle. Along with such discrete antennas, elaborate wiring and tuning is generally needed to identify the location of the RF transmitter with respect to the vehicle.

SUMMARY

A system for determining the location of a portable wireless device with respect to a vehicle is provided. The system comprises a plurality of antennas and a controller. The antennas are positioned about the vehicle for receiving a wireless signal from the portable wireless device. The portable wireless device for being carried by a user and the wireless signal corresponding to at least one of a command and status related to a predetermined vehicle operation. The controller for being operably coupled to each antenna. The controller being configured to generate a location signal indicative of the location of the portable wireless device based on an arrival time of the wireless signal at one or more antennas of the plurality of antennas. The controller being configured to perform the predetermined vehicle operation based on the location signal.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

The embodiments of the present invention as set forth in FIGS. 1-7 generally illustrate and/or describe at least one controller (or module), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers (or modules) may be combined with each other and/or separated in any manner based on the particular type of electrical architecture that is desired or intended to be implemented in the vehicle.

Figure 1:
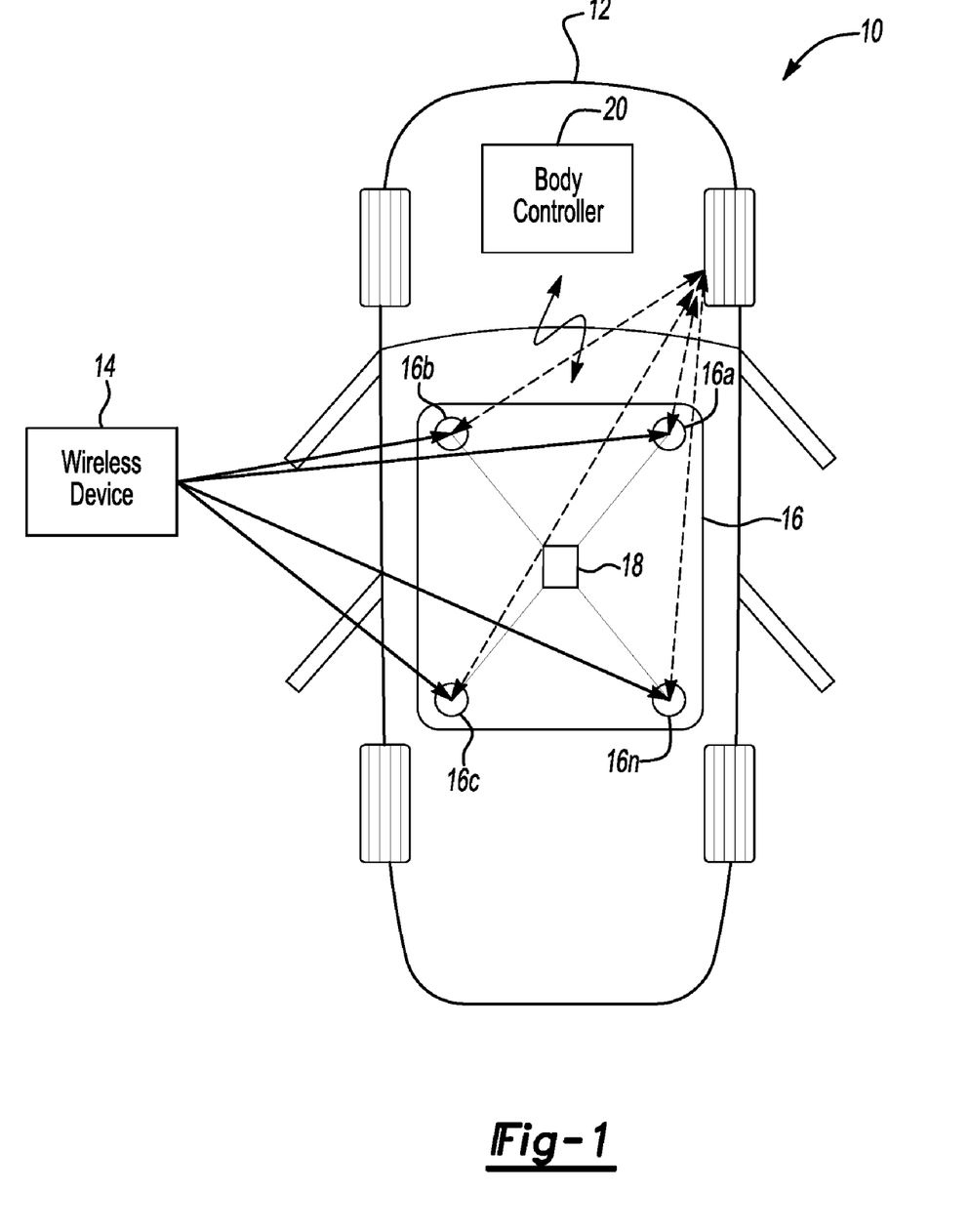
FIG. 1 depicts a system for detecting radio signals in a vehicle in accordance to one embodiment of the present invention.

Referring now to FIG. 1, a system 10 for detecting radio signals in a vehicle 12 in accordance to one embodiment of the present invention is shown. The system 10 includes a wireless device(s) 14 and an antenna array 16. The wireless device 14 may be implemented as one of a keyfob, cell phone, one or more tire pressure sensors, or other suitable distributed transponder generally recognized to facilitate transmission of RF based signals to the vehicle 12

The antenna array 16 generally comprises a plurality of antennas 16a-16n positioned within a headliner of the vehicle 12. Each antenna 16a-16n may be omni-directional such that RF signals may be received from any direction. The antennas 16a-16n may also be bi-directional or other suitable configuration. A central controller 18 is operably coupled to the antennas 16a-16n for receiving RF signals therefrom. The headliner may provide a non-conducting structure which extends close to each of the windows of the vehicle 12 for RF visibility. It is generally understood that the antenna array 16 may be positioned anywhere in the vehicle. Further, the antennas 16a-16n may separated such that one or more of the antennas are positioned in the headliner of the vehicle and the remaining antennas are positioned in other areas of the vehicle. The particular arrangement of the antennas 16a-16n in the vehicle may vary based on the desired criteria of a particular implementation. It is generally contemplated that the length for each antenna 16a-16n with respect to the central controller 18 be similar to one another. In yet another example, the antennas 16a-16n may be positioned within the central controller 18 provided the RF signal is comprised of a high frequency (e.g., 10 GHz or above).

Each antenna 16a-16n includes at least one channel that is different from one another. For example, antenna 16a includes channel CHAN_A, antenna 16b includes channel CHAN_B, antenna 16c includes channel CHAN_C, and antenna 16n includes CHAN_N for receiving one or more RF signals from the wireless device 14 on another channel. In general, at least one channel (e.g., CHAN_A-CHAN_N) may be configured to transmit RF data back to the wireless device 14.

Each antenna 16a-16n may be coupled to a flat flexible transmission line or coaxial cable that is fed to the central controller 18. A body controller 20 (or other suitable vehicle controller) may be operably coupled to the central controller 18 for receiving commands and other such data therefrom. In one example, a data bus may be used to facilitate communication between the central controller 18 and the body controller 20. The data bus may be a Control Area Network (CAN), Local Interconnect Network (LIN), or other such suitable data communication link generally recognized to facilitate data communication between controllers in a vehicle. In another example, the body controller 20 may also include an antenna (not shown) to facilitate communication with the central controller 18 for wireless communication.

The system 10 may be implemented to perform vehicle operations comprising of, and not limited to, remote keyless entry (RKE), carfinder, passive entry, passive start, immobilizer, TPMS, wireless switching (e.g., commands generated from wireless devices on doors for controlling unlock/lock, open/close window or other such operation performed by a switch on the door), and/or wireless occupancy detection in response to RF signals transmitted from the wireless device(s) 14. The central controller 18 may transmit RF signals to the wireless device 14 in the event a particular vehicle operation such as passive entry/start or car finder is executed.

In general, the central controller 18 is configured to determine the direction and/or location of the wireless device(s) 14 with respect to the vehicle 12 such that any vehicle operation that desires the location of the wireless device may operate for its intended purpose. The central controller 18 may generate a location signal that is indicative of the location of the wireless device 14 with respect to the vehicle. The central controller 18 transmits the location signal to the body controller 20 in response to receiving RF signals from the wireless devices 14. As noted above, the TPMS vehicle operation generally requires knowledge of the whereabouts of each tire pressure sensor so that the body controller 20 identifies the particular tire that is experiencing the low pressure condition in response to the identification signal. For passive entry/start function, the body controller 20 may identify which door to unlock and confirm that the key (or wireless device 14) is in the vehicle to perform the passive entry/start function, respectively in response to the identification signal. For immobilization function, the body controller 20 may identify whether the key (or wireless device 14) is out of the vehicle to immobilize the vehicle (e.g., prevent the vehicle from starting) in response to the identification signal. The body controller 20 may lock/unlock a particular door or open/close a particular window in response to the central controller 18 determining which switch (or wireless device 14) on a particular door is transmitting a command. In addition, the body controller 20 may determine which seat is occupied by an occupant in response to the central controller 18 receiving signals from wireless sensors (or wireless devices 14) positioned in various seats of the vehicle 12. All of the above, are non-limiting examples in which it may be necessary to determine the location of the particular wireless device 14 that is transmitting RF signals with respect to the vehicle 12.

Figure 2:
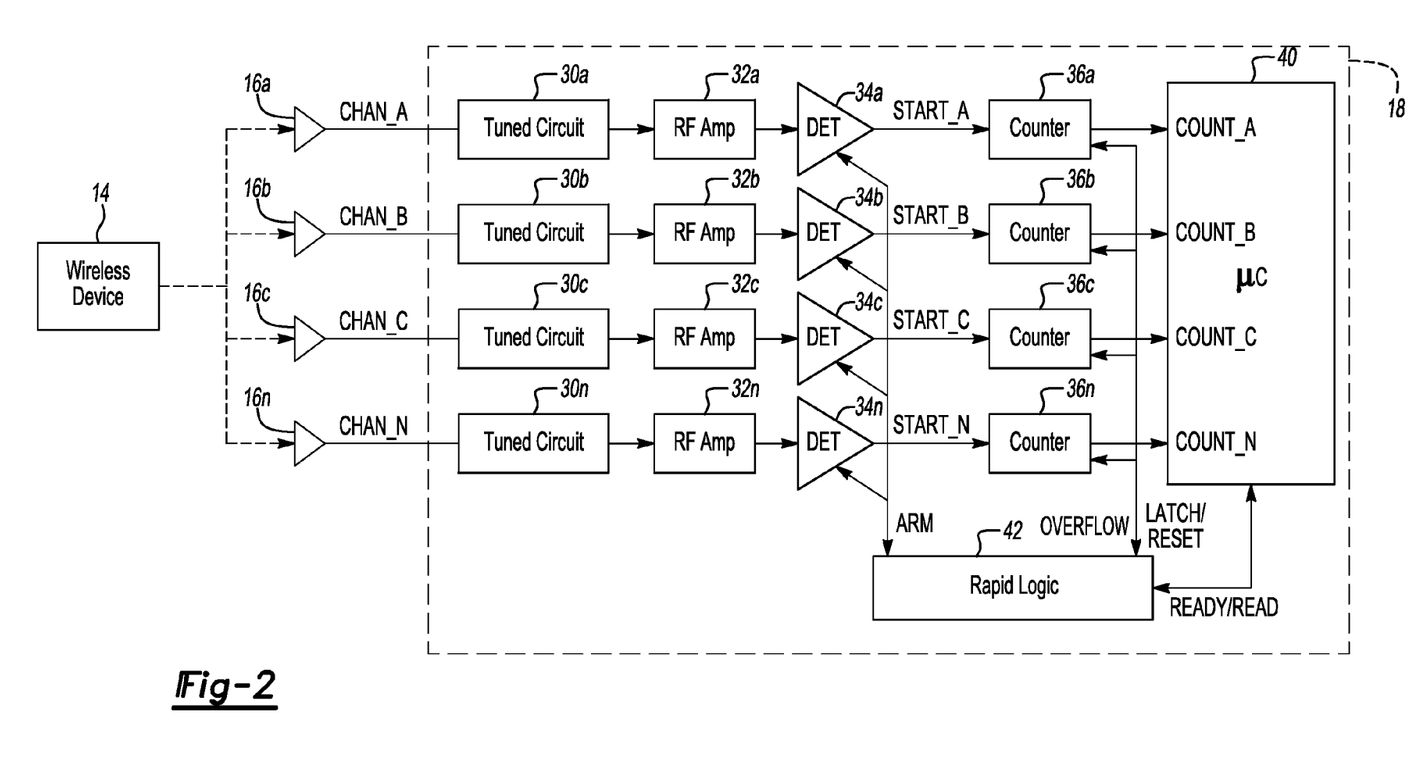
FIG. 2 depicts a first detailed diagram of the central controller in accordance to one embodiment of the present invention.

Referring now to FIG. 2, a detailed diagram of a portion of the central controller 18 in accordance to one embodiment of the present invention is shown. The central controller 18 includes a plurality of tuned circuits 30a-30n that are operably coupled to the antennas 16a-16n. The tuned circuits 30a-30n are configured to receive RF signal(s) from the wireless device 14 within a predetermined RF frequency range. The tuned circuits 30a-30n discard RF signals that are not within the predetermined RF range. A plurality of RF amplifiers 32a-32n are operably coupled to the tuned circuits 30a-30n. The RF amplifiers 32a-32n are configured to increase the gain of the RF bursts present on the RF signal. A plurality of detectors (or comparators) 34a-34n are operably coupled to the RF amplifiers 32a-32n to detect the leading edge of each RF signal.

A plurality of counters 36a-36n are operably coupled to the detectors 34a-34n. Each counter 36a-36n is configured to start counting and generate a count value (e.g., COUNT_A-COUNT_N) in response to receiving a signal START_A-START_N from a corresponding detector 34a-34n. A microprocessor 40 is operably coupled to the counters 36a-36n for receiving the count values COUNT_A-COUNT_N generated by the counters 36a-36n. The microprocessor 40 stores the count values COUNT_A-COUNT_N for the counter 36a-36n and makes a determination of the location of the wireless device 14 in response to processing the count values COUNT_A-COUNT_N. Rapid logic 42 is operably coupled to the detectors 34a-34n, the counters 36a-36n, and the microprocessor 40. The rapid logic 42 is generally defined as customized digital circuitry that is configured to control the counters 36a-36n and/or the detectors 34a-34n under both time-critical and non-time-critical situations.

The rapid logic 42 is configured to enable or reset the detectors 34a-34n in response to receiving a signal READY from the microcontroller 40. The rapid logic 42 transmits a signal ARM to the detectors 34a-34n in response to receiving the signal READY. Each counter 36a-36n is configured to initiate counting in response to the signal START_A-START_N from the corresponding detector 34-a-34n. The counters 36a-36n are configured to stop counting in response to a signal LATCH transmitted from the rapid logic 42. The rapid logic 42 transmits a signal READ to the microcontroller 40 to control the microcontroller 40 to read the count values for each counter 36a-36n. The counters 36a-36n receive a signal RESET from the rapid logic 42 to clear the contents of the counters 36a-36n to zero and to initiate a new count sequence in response to receiving RF bursts on a new RF signal. The counters 36a-36n transmit a signal OVERFLOW to the rapid logic 42 to notify the rapid logic 42 of an overflow condition at one or more of the counters 36a-36n.

In operation, the rapid logic 42 may transmit the signal ARM simultaneously to the detectors 34a-34n such that the detectors 34a-34n are armed to enable detection of the RF signal. Each counter 36a-36n starts a count sequence in response to a corresponding detector 34a-34n detecting the presence of an RF burst on the RF signal. Each counter 36a-36n may be arranged such that each counter 36a-36n is capable of achieving an overflow condition. In general, the first counter 36a-36n that reaches an overflow condition is generally indicative of the channel (e.g., CHAN_A-CHAN_N) (or antenna 16a-16n) that receives the RF signal first. When a counter 36a-36n overflows, such a counter 36a-36n transmits the signal OVERFLOW to the rapid logic 42.

The rapid logic 42 transmits the signal LATCH to the remaining counters 36a-36n that may be in the process of counting (or within a count sequence) to stop counting or to cease the count sequence in response to the first counter 36a-36n reaching the overflow condition. As noted above, it may be assumed that the first antenna (or channel) to receive the RF signal may include the first counter 36a-36n to experience an overflow condition. The count (or count values COUNT_A-COUNT_N) of the counters 36a-36n that did not experience the overflow condition obtain lesser count totals than the counter that experiences the overflow condition. The size of the count is generally indicative of the order in which the antennas received the RF signal. As such, the counter with the smallest count may be determined as the antenna 16a-16n which was the last to detect the RF signal. The counts for each counter 36a-36n is generally proportional to the delay time between RF signal detection between the antennas 16a-16n. The maximum delay time that may be exhibited is generally between the antennas 16a-16n that are diagonally positioned to one another. For example, in reference to FIG. 1, assuming that antenna 16b is the first to detect the RF signal, the delay time between antenna 16b and 16n may be considered to be the maximum delay time as antenna 16a and/or antenna 16c are likely candidates to detect the RF signal next, before antenna 16n.

Each counter 36a-36n may have sufficient capacity to allow the last counter 36a-36n to begin counting (or begin a count sequence) before the first counter 36a-36n reaches an overflow condition. Once the overflow condition has occurred, the rapid logic 42 transmits the signal READ so that the microcontroller 40 reads the count values COUNT_A-COUNT_N from the counters 36a-36n. The rapid logic 42 transmits the signal RESET to the counter 36a-36n to clear the counters 36a-36n in response to receiving the signal READY from the microprocessor 40. The microcontroller 40 determines the location of the wireless device 14 based on the count values stored therein and reports the location of the wireless device 14 on the location signal which is sent to the body controller 20 via the data bus. The body controller 20 may use the data on the location signal to perform one or more of the vehicle operations described above. The rapid logic 42 transmits the signal ARM to the detectors 34a-34n to initiate the detection process again.

It is generally contemplated that the counters 36a-36n may count cycles of the RF signal or alternatively, the counters 36a-36n may count pulses of a common clock reference. In one example, the counters 36a-36n may be implemented as high-speed counters. In yet another example, the counters 36a-36n may be implemented as analog time interval integrators where an A/D converter may be needed.

Figure 3:
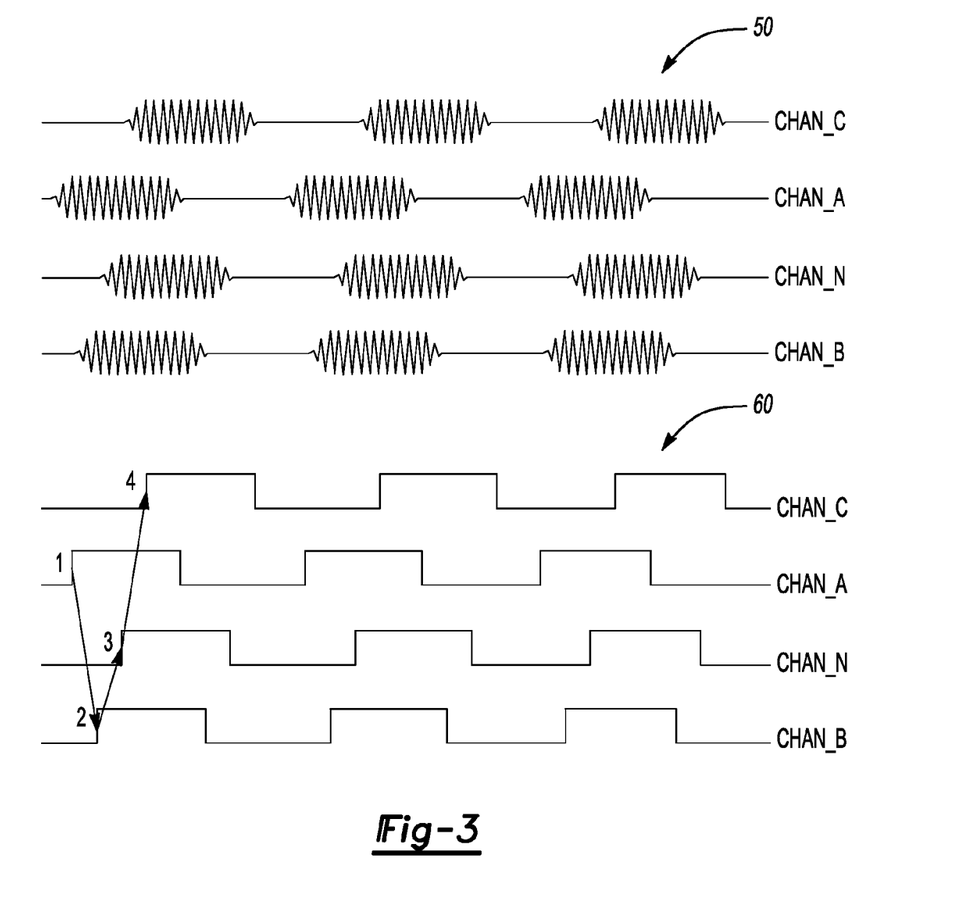
FIG. 3 depicts RF bursts received on the multiple channels in accordance to one embodiment of the present invention.

Referring now to FIG. 3, diagrams corresponding to RF bursts of the RF signal and binary signals are shown at 50 and 60, respectively. At 50, the RF bursts on the RF signal are shown in a raw format. At 60, RF binary equivalents of the RF bursts are shown. In general, the central controller 18 is configured to detect the leading edges of the RF bursts. In one example, the wireless device 14 may be configured to transmit a plurality of RF bursts or signals in response to the wireless device 14 being actuated by the vehicle occupant. Data may be encoded on the RF signal by shifting the repetition rate.

While a single transmitted burst is sufficient to detect the location of the wireless device 14, a single burst on the RF signal may not contain any of the information relevant to the particular vehicle operation that is to be performed. Firstly, data may be needed to distinguish one wireless device 14 from another. For example, whether the wireless device 14 is a keyfob or a TPMS sensor or whether the wireless device 14 belongs to the vehicle 12 or another vehicle. Secondly, data may be needed to provide a command or a measurement, such as LOCK or UNLOCK for RKE operation, or TIRE PRESSURE and TEMPERATURE for TPMS operation.

One way to carry such data on the RF signal is to repeat these short RF bursts with some pattern. The repetition rate is generally the measure of how rapidly the bursts are repeated (as in "bursts per second"). Alternatively, this could be expressed as the time between bursts.

A constant repetition rate may carry minimal amounts of information, so the rate is varied by some scheme. For example, a delay between bursts of 2 milliseconds may represent a binary 0 and a delay of 3 milliseconds may represent a binary 1.

An upper limit of the repetition rate is dependent on the time it takes the RF signal in flight to cover the distance between diagonally opposed antennas 16a-16n. In general, it may not be optimal for a new burst to arrive before the previous burst had traversed all antennas 16a-16n. The repetition rate may be slower than that since the complete processing cycle may be needed to be complete, the slowest part of which may be the sequential reading of the counters 36a-36n by the microprocessor 40.

In reference to 60, the RF signal received on CHAN_A (or at antenna 16a) is the first detected RF signal to arrive at the antenna array 16. The second detected RF signal to arrive at the antenna array 16 is on CHAN_B. The third detected RF signal to arrive at the antenna array 16 is on CHAN_N. In lieu of the sequence of the detected RF signals at the corresponding antennas (16a, 16b, and 16n), the central controller 18 may infer that the direction of the RF signal came from a wireless device 14 positioned proximate to the front passenger side of the vehicle 12 or at the passenger-front door side of the vehicle 12.

Referring back to FIG. 2, it is generally contemplated the central controller 18 may include a surface acoustic wave (SAW) device along with each tuned circuit 30a-30n and RF amp 32a-32n. For example, the central controller 18 may include the tuned circuit 30a, the RF amp 32a and a SAW filter (not shown) operably coupled with one another to form a headend circuit. The headend circuit may be operably coupled to the antenna 16a to receive the RF signal. The tuned circuits 30b-30n and the RF amp 32b-32n may also be coupled to respective SAW filters to form additional headend circuits for each antenna 16b-16n. The output of each headend circuit may be fed to each corresponding detector 34a-34n for RF signal detection.

Figure 4:
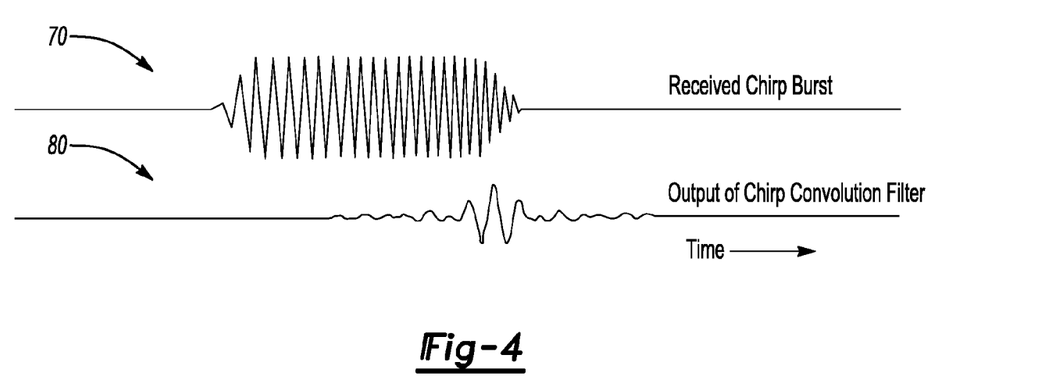
FIG. 4 depicts an RF burst signal waveform and chirp modulation.

FIG. 4 generally illustrates a single RF chirp burst signal 70 that is presented to an input of the headend circuit. Each headend circuit may generate an impulse signal 80 that is fed to a corresponding detector 34a-34n. In general, the SAW filter may generate the impulse signal 80 in response to the RF chirp burst signal 70. Each corresponding detector 34a-34n may detect the peak (or a predetermined level) of the corresponding impulse signal 80 to detect the presence of the RF signal on each of the channels CHAN-A-CHAN_N. The impulse signal 80 may provide better noise rejection characteristics than that of the RF burst signal 70. The operation of the counters 36a-36n, the microcontroller 40, and the rapid logic 42 remains the same as noted in connection with FIG. 2 in the event the headend circuits are implemented.

A chirped RF burst, as received by a suitable chirp filter (such as a chirp SAW of the correct tuning) provides a distinctive signal and may include better noise rejection than a constant-frequency RF burst. In addition, a chirp SAW filter (also known as a convolution filter) may include the effect of "sharpening" the burst of RF energy into a briefer duration waveform with a higher peak amplitude. Such a sharpening improves the time accuracy of detection.

Figure 5:
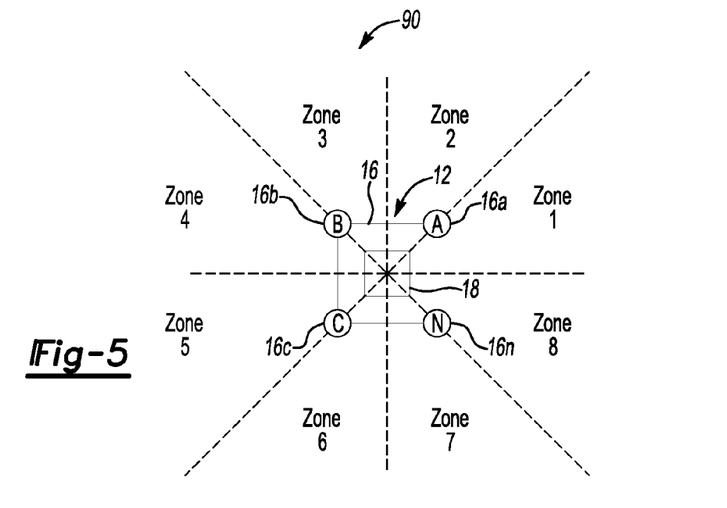
FIG. 5 depicts a zone map used to determine the direction of a received RF signal in accordance to one embodiment of the present invention.

Referring now to FIG. 5, a zone map 90 is shown for determining the location of the wireless device 14 in accordance to one embodiment of the present invention. The antennas 16a-16n of the antenna array 16 may be superimposed over the zone map 90 for purposes of describing the manner in which the central controller 18 determines the location of the wireless device 14. In general, each zone 1-8 within the zone map 90 may correspond to a predesignated section of the vehicle 12 and an area extending away from each predesignated section of the vehicle 12. For example, zone 1 may correspond to a passenger-front door side of the vehicle and the area extending away from the passenger-front door side of the vehicle, zone 2 may correspond to a front-passenger side of the vehicle and the area extending away from the front-passenger side of the vehicle, zone 3 may correspond to a front driver side of the vehicle and the area extending away from the front driver side of the vehicle, zone 4 may correspond to a driver-front door side of the vehicle and the area extending away from the driver-front door side of the vehicle, zone 5 may correspond to a driver-rear door side of the vehicle and the area extending away from the driver-rear door side of the vehicle, zone 6 may correspond to a rear-driver side of the vehicle and the area extending away from the rear-driver side of the vehicle, zone 7 may correspond to a rear-passenger side of the vehicle and the area extending away from the rear-passenger side of the vehicle, and zone 8 may correspond to a passenger-rear door side of the vehicle and the area extending away from the passenger-rear door side of the vehicle.

The zone map 90 may be used in connection with Tables 1a and 1b as illustrated in connection with FIGS. 6A and 6B:

As shown in Table 1a, in the event the central controller 18 determines that the antenna 16a is the first to receive the RF signal, the antenna 16b is second to receive the RF signal, and the antenna 16n is the third to receive the RF signal, the central controller 18 may determine that the wireless device 14 is located in zone 2 (e.g., at the front passenger side of the vehicle, or area extending therefrom). In the event the central controller 18 determines that the antenna 16a is the first to receive the RF signal, the antenna 16n is second to receive the RF signal, and antenna 16b is third to receive the RF signal, the central controller 18 may determine that the wireless device 14 is located in zone 1 (e.g., at the passenger front door side of the vehicle or area extending therefrom).

In the event the central controller 18 determines that the antenna 16b is first to receive the RF signal, the antenna 16a is second to receive the RF signal, and antenna 16c is the third to receive the RF signal, the central controller 18 may determine that the wireless device 14 is located in zone 3 (e.g., at the front-driver side of the vehicle area extending therefrom). In the event the central controller 18 determines that the antenna 16b is the first to receive the RF signal, the antenna 16c is second to receive the RF signal, and the antenna 16a is the third to receive the RF signal, the central controller 18 may determine that the wireless device 14 is located in zone 4 (e.g., at the driver-front door side of the vehicle or area extending therefrom).

Similarly, the corresponding zone (e.g., the location of the wireless device 14 with respect to the vehicle) may be determined in the event the central controller 18 determines that antenna 16c is the first to receive the RF signal or in the event the central controller 18 determines that antenna 16n is the first to receive the RF signal in the manner shown in Table 1b. As illustrated by Tables 1a-1b, by ranking the order in which the RF signal is received on each antenna 16a-16n, it is possible to determine which zone 1-8 the wireless device 14 is positioned in. It is generally contemplated that the central controller 18 (or other suitable controller) may include an algorithm stored therein containing instructions for determining the corresponding zone in which the wireless driver 14 is positioned in accordance to the manner described above. For example, such an algorithm may take into account the particular sequence as to when an RF signal is detected to have arrived at the antennas 16a-16n and to determine the particular location of the wireless device 14 with respect to a particular zone.

Zone map 90 and Tables 1a and 1b are generally used by the central controller 18 to determine a first level of location. Such a first level of location provides information as to which zone the wireless device 14 is positioned within. In the event it is desired to obtain more information related to the location of the wireless device 14 within a particular zone, a hyperbolic grid may be constructed to determine the position of the wireless device 14 within a particular zone. The hyperbolic grid is generally used to provide for a second level of location. The hyperbolic grid may be defined by hyperbolic curves that form grid cells. The grid cells of the hyperbolic grid may be assigned to various delay times between the detected RF signal at the antennas 16a-16n. The delay time between detected RF signals at the antennas 16a-16n generally correspond to the difference between count values determined by the central controller 18 as discussed in connection with FIG. 2.

Figure 7:
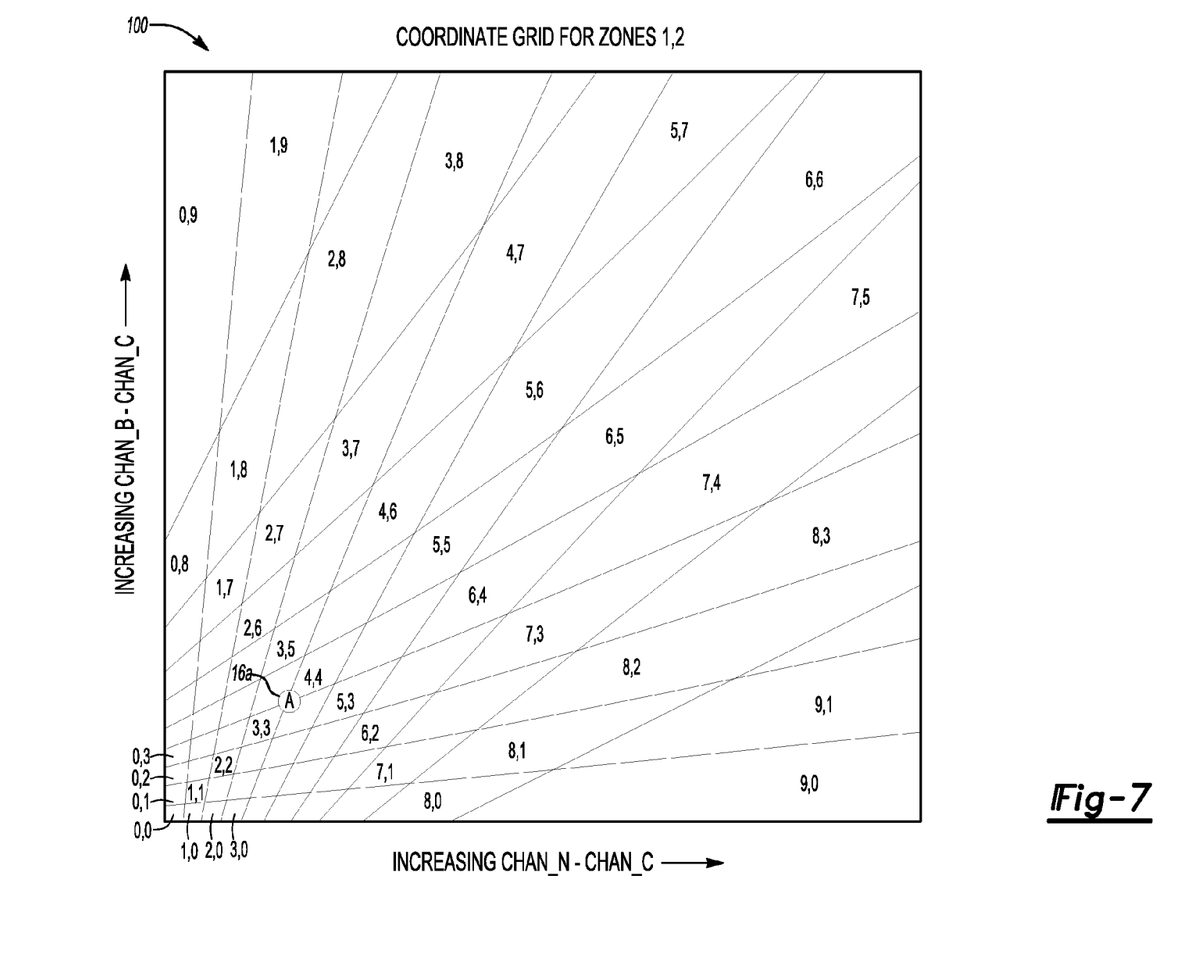
FIG. 7 depicts a hyperbolic grid used to determine the location of the wireless device within a zone of the zone map in accordance to one embodiment of the present invention.

Referring now to FIG. 7, a hyperbolic grid 100 in accordance to one embodiment of the present invention is shown. In general, the hyperbolic grid 100 corresponds to zones 1-2 as shown in connection with FIG. 5. It is generally contemplated that an entire grid may be constructed to include all zones as shown in connection with FIG. 5. The grid 100 is defined by a number of grid cells positioned within zone 1-2. As depicted in grid 100, the location of antenna 16a is indicated at "A". The x-axis of the grid 100 generally corresponds to the difference in counts between the count value stored in counter 36c (e.g., COUNT_C) and the count value stored in counter 36n (e.g., COUNT_N). The y-axis of the grid 100 corresponds to the difference in counts between the count value stored in counter 36c (e.g., COUNT_C) and the count value stored in counter 36b (e.g., COUNT_B).

Figure 6A:
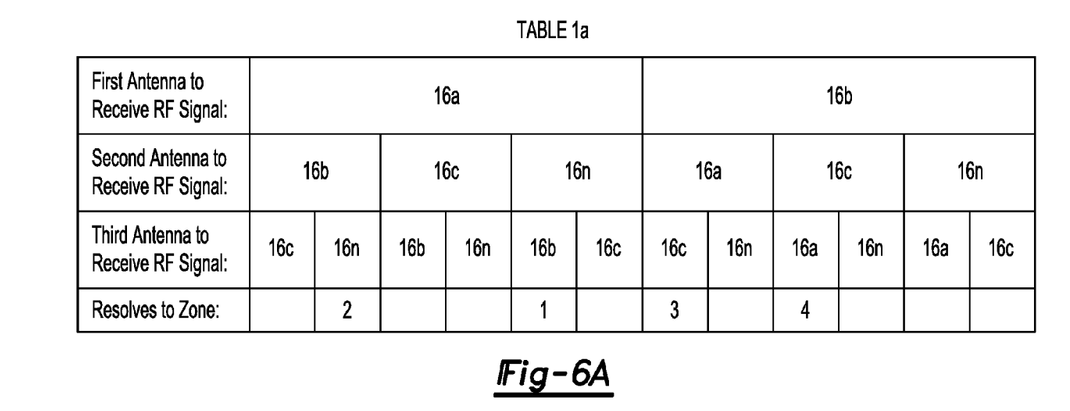
FIGS. 6A and 6B depict tables in accordance to one embodiment of the present invention.
Figure 6B:
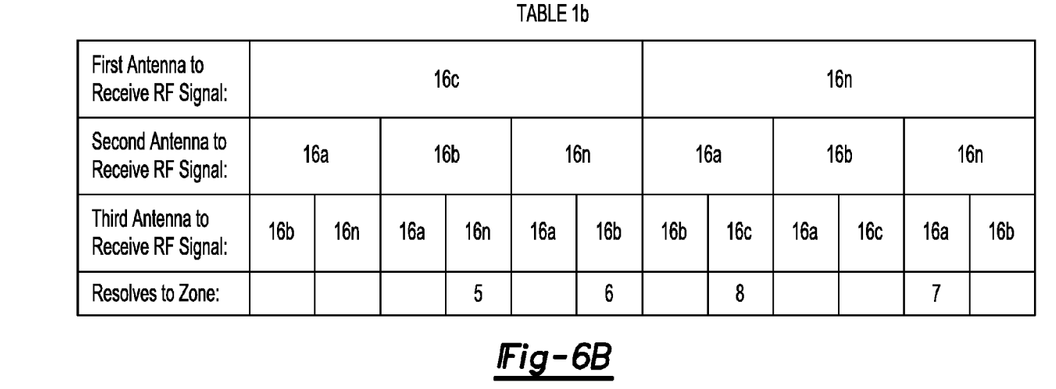

In general, the antenna that first detects the RF signal and/or the antenna that is next to detect the RF signal provides information as to the particular zone in which the wireless device 14 is located (see Table 1a and 1b in FIGS. 5A and 6B, respectively). The difference in counts between the counts of the second and/or third antennas and the last antenna to detect the RF signal provides information as to the particular grid cell in which the wireless device 14 is located.

The values for the cells generally start at (0,0) and extend to (9,0) on the x-axis, and (0,9) on the y-axis. The value of 9 generally represents the maximum count difference between the count values. The maximum count difference may be greater than or less than 9. The particular maximum count difference may vary based on the desired criteria of a particular implementation. The ordered number pairs for each cell are, respectively, the count values stored in counter 36n (e.g., COUNT_N) minus the count value stored in counter 36c (e.g., COUNT_C) and the count value stored in counter 36b (e.g., COUNT_B) minus the count value stored in counter 36c (e.g., COUNT_C). In other words, each cell in zones 1 and 2 of the grid 100 is defined by the following equation:

(COUNT_N−COUNT_C, COUNT_B−COUNT_C)  EQ: 1

Each cell in zones 3 and 4 is defined by the following equation:

(COUNT_C−COUNT_N, COUNT_A−COUNT_N)  EQ: 2

Each cell in zones 5 and 6 is defined by the following equation:

(COUNT_N−COUNT_A, COUNT_B−COUNT_A)  EQ: 3

Each cell in zones 7 and 8 is defined by the following equation:

(COUNT_C−COUNT_B, COUNT_A−COUNT_B)  EQ: 4

Again, cells corresponding to zones 3-8 are not shown in the grid 100. Grid 100 is shown for illustrative purposes.

Referring now to FIG. 7, a method 200 for determining the location of the wireless device 14 with respect to the vehicle 12 is shown. The central controller 18 (or other suitable controller) includes logic (software or hardware or combination thereof) for determining the location of the wireless device 14 with respect to the vehicle 12 as described in the following blocks. Such blocks as described below may be performed sequentially or non-sequentially. Further such blocks are capable of being performed simultaneously or serially with respect to one another. The particular order and execution times for the blocks may vary based on the desired criteria of a particular implementation.

Figure 8:
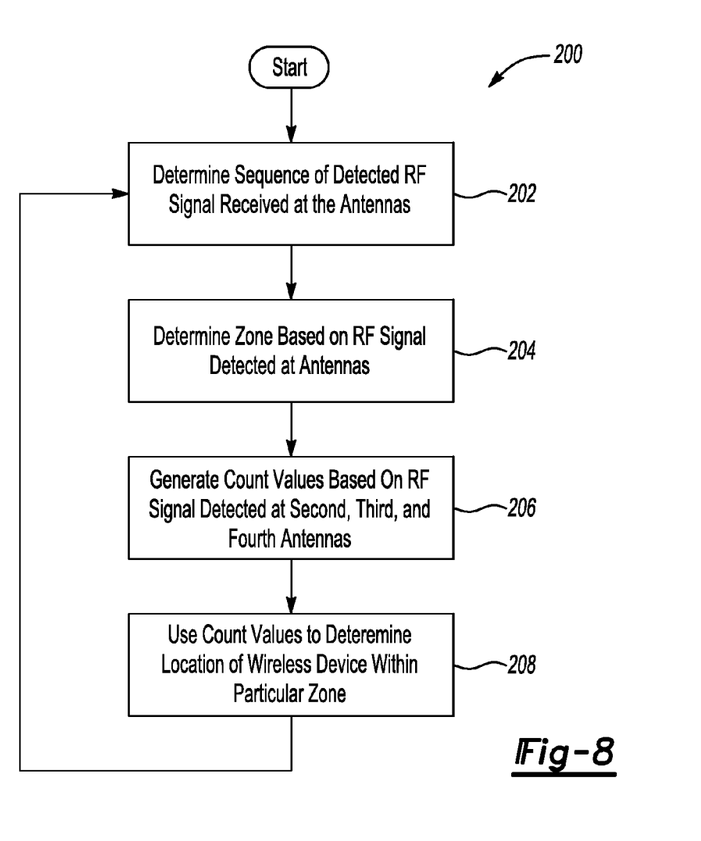
FIG. 8 depicts a method for determining the location of the wireless device with respect to the vehicle in accordance to one embodiment of the present invention.

In block 202, the central controller 18 determines which of the antennas 16a-16n is the first to receive the RF signal. The central controller 18 then determines which of the antennas 16a-16n is the second, third and fourth to receive the RF signal.

In block 204, the central controller 18 determines the particular zone in which the wireless device 14 is located based on which antenna 16a-16n is the first to receive the RF signal and which antenna 16a-16n is then second and third to receive the RF signal (see FIG. 5 and Table 1a and 1b in FIGS. 6A and 6B). The operation performed in block 204 provides for a first level determination as to which zone the wireless device 14 is located in.

In block 206, the central controller 18 generates count values COUNT_A-COUNT_N in response to receiving the RF signal at the antennas 16a-16n.

In block 208, the central controller 18 inserts at least three count values COUNT_A-COUNT_N into one or more of the EQs. 1-4 to determine the location of the wireless device within a particular zone with respect to the vehicle 12. The particular equation used may vary based on which particular zone from the zone map 90 is determined to include the wireless device 14.

In general, the central controller 18 determines the zone (e.g. 1-8) in which the wireless device 14 is located based on the arrival time of the RF signal at the antennas 16a-16n. The central controller 18 further generates count values based on the arrival time of the RF signal at the antennas 16a-16n. The central controller 18 determines the particular location of the wireless device 14 within the zone with respect to the vehicle 12 by inserting the various count values into Eqs. 1-4. The central controller 18 transmits the location signal which is indicative of the location of the wireless device 14 to the body controller 20 so that the body controller 20 controls a particular vehicle operation based on the location signal. It is contemplated that any suitable module/controller may be employed other than the central controller 18 within the vehicle 12 to determine the location of the wireless device 14 within a particular zone.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for determining the location of a portable wireless device with respect to a vehicle, the system comprising:
a plurality of antennas positioned about the vehicle for receiving a wireless signal from the portable wireless device, the portable wireless device for being carried by a user and the wireless signal corresponding to at least one of a command and status related to a predetermined vehicle operation;
a controller operably coupled to each antenna and configured to:
generate a location signal indicative of the location of the portable wireless device based on an arrival time of the wireless signal at the plurality of antennas;
perform the predetermined vehicle operation based on the location signal; wherein the position of each antenna about the vehicle corresponds to a zone that the portable wireless device is capable of being positioned in with respect to the vehicle; and
determine the zone in which the portable wireless device is positioned in based on an order in which the plurality of antennas receives the wireless signal.

2. The system of claim 1 wherein each antenna is equally spaced apart.

3. The system of claim 1 wherein each antenna is omni-directional.

4. The system of claim 1 wherein the controller is further configured generate a count value for each wireless signal received at the plurality of antennas, wherein the count values correspond to the order in which each of the plurality of antennas receives the wireless signal.

5. The system of claim 4 wherein the controller is further configured to determine a difference between the count values to determine the location of the portable wireless device in the zone.

6. The system of claim 1 further comprising:
a tuned circuit for receiving the wireless signal at a predetermined frequency from a particular antenna of the plurality of antennas;
an amplifier for increasing the gain of the wireless signal after receiving the wireless signal at the predetermined frequency;
a detector for detecting the wireless signal after the amplifier increases the gain of the wireless signal; and
a counter for generating a count value after the detector detects the wireless signal.

7. The apparatus of claim 4 wherein the count values comprise a first count value and a second count value, the first count value being greater than the second count value, the first count value being indicative of a first antenna that is the first to receive the wireless signal and the second count value being indicative of a second antenna that receives the wireless signal after the first antenna.

8. An apparatus for determining the location of a portable wireless device with respect to a vehicle, the apparatus comprising:
- a controller for being operably coupled to a plurality of antennas positioned about the vehicle for receiving a wireless signal from the portable wireless device, the portable wireless device for being carried by a user and the wireless signal corresponding to at least one of a command and status related to a predetermined vehicle operation, the controller being configured to:
- generate a location signal indicative of the location of the portable wireless device based on an arrival time of the wireless signal at the plurality of antennas;
- perform the predetermined vehicle operation based on the location signal; and
- determine a zone in which the portable wireless device is positioned in based on an order in which the plurality of antennas receives the wireless signal.

9. The system of claim 8 wherein the controller comprises:
- a tuned circuit for receiving the wireless signal at a predetermined frequency from a particular antenna of the plurality of antennas;
- an amplifier for increasing the gain of the wireless signal after the tuned circuit receives the wireless signal at the predetermined frequency;
- a detector for detecting the presence of the wireless signal after the amplifier increases the gain of the wireless signal; and
- a counter for generating the count value after the detector detects the wireless signal.

10. The apparatus of claim 8 wherein the controller is further configured to generate a count value for each wireless signal received at the plurality of antennas, wherein the count values are indicative the order in which each of the plurality of antennas receives the wireless signal.

11. The apparatus of claim 10 wherein the controller is further configured to determine a difference between the count values to determine the location of the portable wireless device in the zone.

12. The apparatus of claim 10 wherein the count values comprise a first count value and a second count value, the first count value being greater than the second count value, the first count value being indicative of a first antenna that is the first to receive the wireless signal and the second count value being indicative of a second antenna that receives the wireless signal after the first antenna.

13. A method for determining the location of a portable wireless device with respect to a vehicle, the method comprising:
- receiving a wireless signal form the portable wireless device at a plurality of antennas positioned about the vehicle, the portable wireless device for being carried by a user and for enabling a predetermined vehicle operation, the wireless signal corresponding to at least one of a command and status related to the predetermined vehicle operation;
- determining an order in which the plurality of antennas receives the wireless signal to determine which zone includes the portable wireless device;
- generating a location signal indicative of the location of the portable wireless device based on the order in which the plurality of antennas receives the wireless signal; and
- performing the predetermined vehicle operation based on the location signal.

14. The method of claim 13 further comprising:
- receiving the wireless signal at a predetermined frequency from a particular antenna of the plurality of antennas;
- increasing the gain of the wireless signal after receiving the wireless signal at the predetermined frequency;
- detecting the wireless signal at the particular antenna after increasing the gain of the wireless signal; and
- generating a count value after detecting the wireless signal at the particular antenna.

15. The method of claim 13 further comprising generating a count value for each wireless signal received at the plurality of antennas, wherein the count values are indicative of the order in which the plurality of antennas receives the wireless signal.

16. The method of claim 15 further comprising determining a difference between the count values to determine the location of the portable wireless device in the zone.

17. The method of claim 15 wherein the count values comprise a first count value and a second count value, the first count value being greater than the second count value, the first count value being indicative of a first antenna that is the first to receive the wireless signal and the second count value being indicative of a second antenna that receives the wireless signal after the first antenna.

* * * * *

UNITED STATES PATENT AND TRADEMARK OFFICE
CERTIFICATE OF CORRECTION

| | | |
|---|---|---|
| PATENT NO. | : 8,335,598 B2 | Page 1 of 1 |
| APPLICATION NO. | : 12/236043 | |
| DATED | : December 18, 2012 | |
| INVENTOR(S) | : Dickerhoof et al. | |

It is certified that error appears in the above-identified patent and that said Letters Patent is hereby corrected as shown below:

Title Page, Item (75) Inventors should read:
--(75)  Inventors:  Greg Dickerhoof, Ann Arbor, MI (US); Gary Boothroyd, Farmington Hills, MI (US); Riad Ghabra, Northville, MI (US)--.

Signed and Sealed this
Sixteenth Day of June, 2015

Michelle K. Lee
*Director of the United States Patent and Trademark Office*